United States Patent [19]

Dehgani et al.

[11] Patent Number: 4,896,353
[45] Date of Patent: Jan. 23, 1990

[54] APPARATUS FOR FAST DECODING OF A NON-LINEAR CODE

[75] Inventors: Ayyoob A. Dehgani, Salt Lake City; Craig K. Rushforth, Kaysville, both of Utah

[73] Assignee: Unisys Corp., Blue Bell, Pa.

[21] Appl. No.: 248,866

[22] Filed: Sep. 23, 1988

[51] Int. Cl.[4] .......................... H04L 9/00; H03M 7/50
[52] U.S. Cl. .......................................... 380/6; 380/28; 341/75; 341/107
[58] Field of Search .......................... 375/1; 380/28, 6; 340/825.69; 341/75, 107

[56] References Cited

U.S. PATENT DOCUMENTS 4,633,247 12/1986 Hegeler ........................... 340/825.69

OTHER PUBLICATIONS

Proc. on 25 Confon C[3], 598-9 (9/87) Rushforth et al., Abstract, "Efficient ML Decoding of Extended Nordstrom Robinson Code", IEEE Trans. Info Theory, vol. IT 33, No. 6 931-6 (11/87) Abstract, Fast ML Decoding for Nordstrom Robinson Code.

Primary Examiner—Salvatore Cangialosi
Attorney, Agent, or Firm—John Sowell; Mark Starr; Robert Bramson

[57] ABSTRACT

The present invention provides a high-speed decoder for decoding signals encoded into Nordstrom-Robinson 16,256,6 non-linear code. The novel decoder receives a transmitted encoded signal in the form of a multi-dimensional vector to be decoded. The decoder comprises a plurality of computing elements coupled to the input encoded signals and produces modified multi-dimensional vectors and subcode values which are decoded in a plurality of subcode decoders to produce intermediate inner product values and information words associated with the intermediate inner product values. The intermediate inner product values are compared in comparator means to provide the maximum intermediate inner product value and its associated information which is indicative of the best mathematical estimate of the encoded signal being decoded.

11 Claims, 3 Drawing Sheets

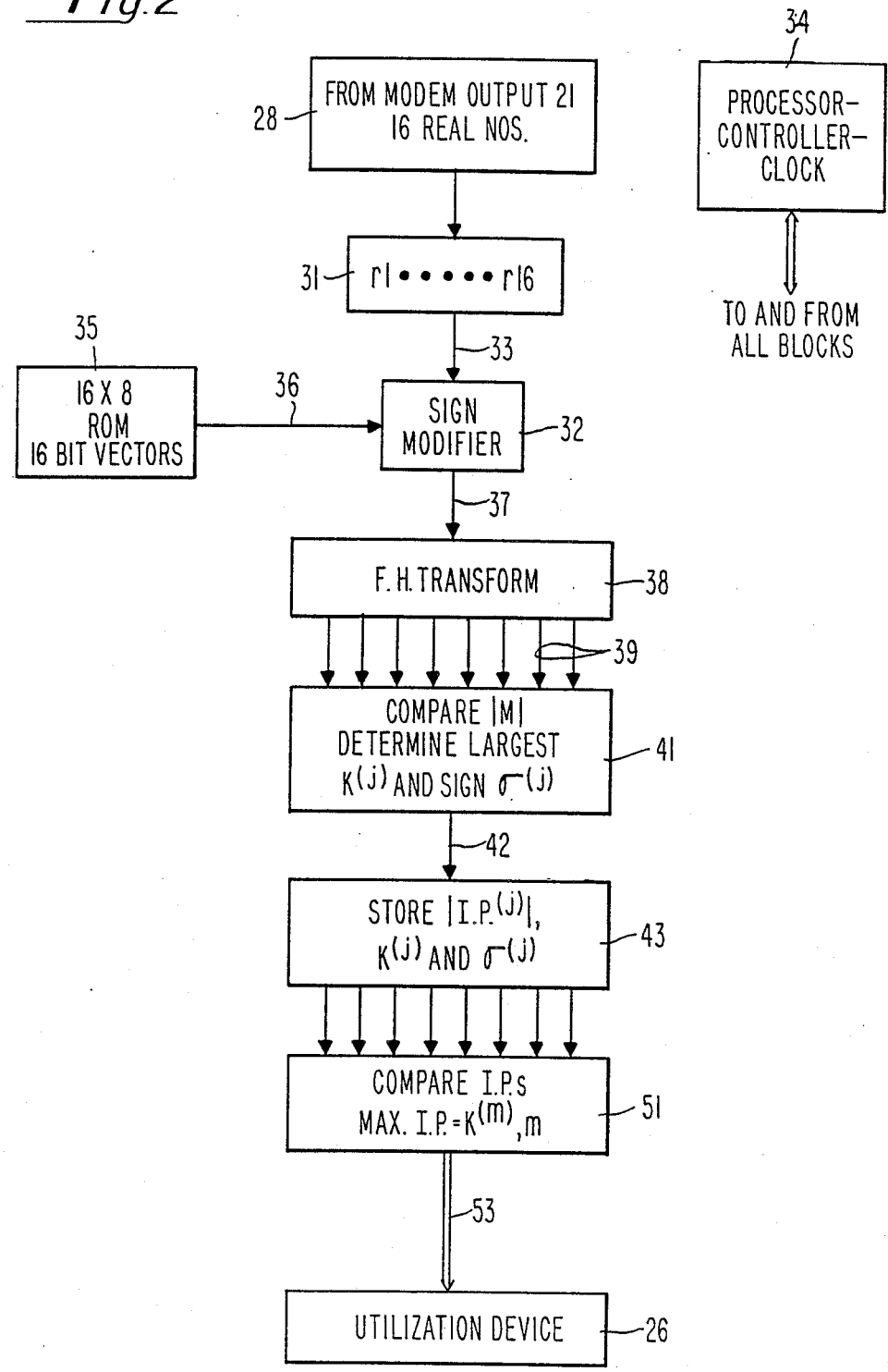

APPARATUS FOR FAST DECODING OF A NON-LINEAR CODE

BACKGROUND OF THE INVENTION

1. Field of the Invention

This invention relates to apparatus and a method for fast real time decoding of Nordstrom-Robinson encoded information in the presence of additive white Gaussian noise (AWGN). More particularly, the present invention relates to an exact fast maximum likelihood (ML) decoder employed in a receiver for decoding demodulated signals that were previously coded into Nordstrom-Robinson (16,256,6) non-linear code for transmission in an AWGN channel.

2. Description of the Prior Art

Heretofore, maximum likelihood (ML) decoding of Nordstrom-Robinson coded information was known. The prior art direct method of performing maximum likelihood decoding of a binary block code L in length in the presence of additive white Gaussian noise maps an arbitrary point $X$ in $R^n$ onto that codeword closest in Euclidean distance. The advantage of this maximum likelihood decoding technique is a coding gain of approximately 2 db over hard decision decoding accomplished for the same code. The most direct approach to maximum likelihood decoding is to compute the Euclidean distance from the received vector x for each codeword and then to select the codeword u closest to x in Euclidean distance. The complexity of this procedure grows rapidly with the size of the code and renders the implementation of high-speed apparatus of this procedure impractical for real time decoding.

J. H. Conway and N. J. A. Sloan in their article entitled "Soft Decoding Techniques for Codes and Lattices, Including the Golay Code and the Leech Lattice", IEEE Trans. Inform. Theory, Vol. IT-28, No. 1, Pg. 41–50, January 1986 describe a general procedure for maximum likelihood decoding that can be made more efficient than the direct method procedure referred to above if the code being decoded has a subcode of small index that can itself be rapidly decoded.

It has been found that the above-mentioned Conway and Sloan procedure can be applied to maximum likelihood decoding of the non-linear extended Nordstrom-Robinson (NR) code which has an easily decoded subcode with an index 32.

It would be extremely desirable to provide decoding apparatus and a method for maximum likelihood decoding of a non-linear code employing coset leaders of a partition subcode and to reduce the complexity of the decoding procedure to enable real time decoding of a Nordstrom-Robinson Code.

SUMMARY OF THE INVENTION

A principal object of the present invention is to provide a novel decoder for decoding Nordstron-Robinson encoded information in real time.

Another principal object of the present invention is to provide a high-speed decoder for decoding demodulated signals that were coded into Nordstrom-Robinson (16,256,6) non-linear code and transmitted in an additive white Gaussian noise (AWGN) channel.

Another principal object of the present invention is to provide a highly simplified and economical Nordstrom-Robinson decoder.

Another object of the present invention is to provide a decoder which operates in real time and may be coupled to the output of a modem-receiver.

Another object of the present invention is to provide a high-speed decoding circuit which may be implemented as a single very large scale integrated (VLSI) circuit device.

It is a general object of the present invention to provide a Nordstrom-Robinson decoder that performs exact maximum likelihood decoding of a non-linear code.

It is a general object of the present invention to provide apparatus for decoding a non-linear code employing coset leaders of a partitioned code stored in a ROM to reduce the time and structure required to decode the parent code.

It is yet another general object of the present invention to provide apparatus for decoding a parent code by performing a sequence of decoding operations of a subcode.

According to these and other objects of the present invention, there is provided a novel high-speed decoder for decoding Nordstrom-Robinson encoded information which comprises a plurality of computing elements coupled to a source of signals to be encoded. Each of the computing elements has means for modifying the input signals and for producing subcode values ($S_K$). A plurality of subcode decoders are coupled to the computing elements for producing intermediate inner product (ip) values and associated information (info) values indicative of said intermediate inner product. The intermediate inner product values are compared one with another and the maximum inner product value is selected as the mathematical best estimate of the maximum inner product. The information bits associated with the maximum inner product are employed to produce information bit output signals indicative of the best mathematical estimate of the encoded input signal being decoded.

BRIEF DESCRIPTION OF THE DRAWINGS

FIG. 2 is a block diagram of a Nordstrom-Robinson fast decoder employing a fast Hadamard transform illustrating the complexity of decoding Nordstrom-Robinson encoded information from a parent code;

DESCRIPTION OF THE PREFERRED EMBODIMENT

Figure 1:
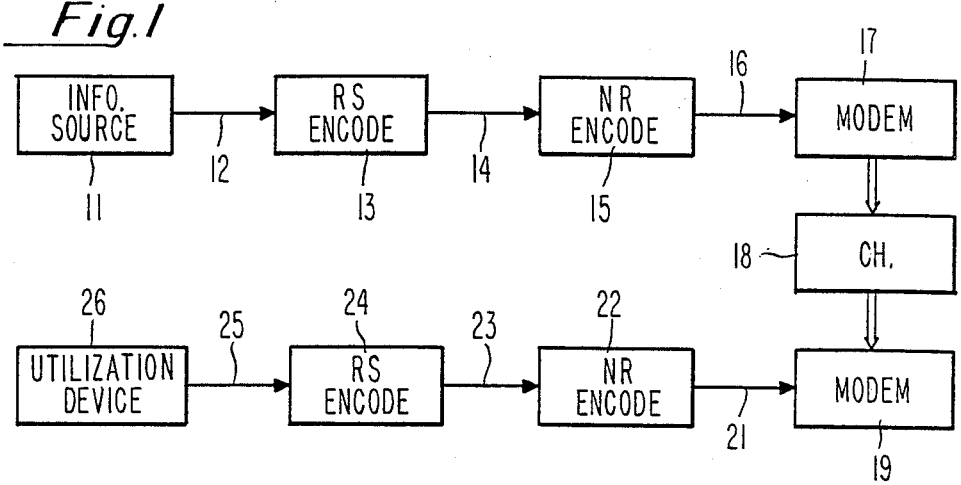
FIG. 1 is a block diagram showing an encoding digital communication system coupled through an AWGN channel to a receiver having a Nordstrom-Robinson decoder of the type employed in the present invention.

Refer now to FIG. 1 showing a block diagram of a communication system 10 in which the preferred embodiment Nordstrom-Robinson decoder is utilized. In the system 10, digital information from information source 11 is first encoded into an outer code by outer code encoder 13 at a first level of redundancy. The encoded outer code is again encoded at a second level of redundancy at a Nordstrom-Robinson encoder 15 to provide an inner code of codewords in the form of a sequence of bits which are suitable for transmission by commercially available modems.

The binary digital information to be encoded which is provided at information source 11 produces digital information on line 12. The digital information on line 12 is applied to a conventional Reed-Solomon encoder 13 to produce the aforementioned outer code as a binary stream on line 14. The outer code encoded binary information on line 14 is applied to a Nordstrom-Robinson encoder 15 to produce the aforementioned inner code at a second level of redundancy. The encoded binary stream on line 16 is applied to a standard commercially available modem 17. The modem 17 modulates and converts the binary coded stream or sequence of digital bits into a sequence of waveforms of the type suitable for transmission over channel 18 which generates noise that causes errors. For purposes of this explanation it will be assumed that channel 18 introduces only additive white Gaussian noise (AWGN).

Typically, the receiving modem 19 receives the transmitted waveforms and converts and demodulates the received waveforms into a stream or sequence of sixteen dimensional vectors of real numbers representative of the Nordstrom-Robinson encoded information which was produced on line 16 in binary form. The vector information on line 21 is then applied to the present invention Nordstrom-Robinson decoder 22. Decoder 22 decodes the sixteen dimensional vectors of real numbers into blocks of eight digital bits each, very similar to the information originally supplied to the encoder 15 that did not include the AWGN and other errors which must be resolved. Decoder 22 removes the redundancy of the encoder 15 and provides eight digital bits of information on output line 23 representative of the information on line 14 being encoded. The real time output of decoder 22 is in binary form and is a best estimate of the same information originally supplied on line 14.

The information on line 23 is then applied to a Reed-Solomon decoder 24 of the type described in the paper "Polonomial Codes Over Certain Finite Fields"; Journal of the Socity of Industrial Management (SIAM) Vol. 8, pp 300-304; 1960 by I. S. Reed and G. Solomon. The Reed-Solomon decoder 24 corrects some of the errors of the estimated binary information on line 23 and also provides an enhanced estimate on line 25 of the information which originally was applied on line 12 of the system 10. The binary information on line 25 is applied to a utilization device 26 such as a high-speed printer or a memory storage device or similar apparatus which receives and stores the received transmitted information. As will be explained in more detail hereinafter, the Nordstrom-Robinson decoder 22 employs 256 correlations, one for each possible codeword in Nordstrom-Robinson code, thus, every word received is correlated with each possible codeword so that the result achieved is best defined as a best estimate which is not a compromise. Prior art maximum likelihood (ML) decoding procedures only provided an estimate or approximation but not a best estimate which is synonomous with a mathematical minimum error produced by decoder 22.

Refer now to FIG. 2 showing a block diagram of a fast decoder which employs a fast Hadamard transform (FHT). This embodiment is based on a partitioning of Nordstrom-Robinson code into Reed-Muller RM(4,1) code with an index of 8. The decoding time for this embodiment can be shown to require only one-quarter of the computations and time required for the aforementioned direct maximum likelihood decoding of the parent Nordstrom-Robinson code. If Nordstrom-Robinson code is partitioned into a subcode with $2^p$ coset leaders, then the encoding of Nordstrom-Robinson code is assumed to be as follows: (1) first p bits are used to select one out of $2^p$ coset leaders, (2) then (8-p) bits are used to be encoded in the subcode. These two results are added modulo 2 to produce the corresponding 16-bit codeword of Nordstrom-Robinson code. This way of encoding makes it very easy to extract the information bits while performing maximum-likelihood decoding. The information on line 21 in FIG. 1 to be decoded is shown buffered or stored in block 28 as it appears from modem 19 on line 21. The buffered information on line 29 is applied alternately to buffer registers 31. Buffer registers 31 contains sixteen real numbers to be decoded. The information stored in registers 31 is available to sign modifier 32 via line 33. Sign modifier 32 modifies the sign of the sixteen dimensional vector on line 33 according to data on line 36 under control of processor-controller-clock 34 which is connected to the multiplier and all of the other logic blocks shown in FIG. 2 to control and sequence the operations. ROM 35 has stored therein a set of coset leaders, each of which is a 16 bit binary vector. The previously stored coset leaders in ROM 35 are obtained from a specific partitioning of the Nordstrom-Robinson code with RM(4,1) code as a subcode. ROM 35 comprises a $16\times 8$ memory which contains 8 sixteen dimensional binary coset leaders each of which will change the sign of the real numbers stored in buffer registers 31. The output of sign modifier 32 on line 37 comprises a sixteen dimensional vector of real numbers which is applied to the fast Hadamard transform block 38 to produce sixteen positive inner products (IPs) on lines 39. The inner products $IP^{(j)}$ are compared in comparator 41 to determine the inner product having the largest absolute value M expressed as a magnitude $IP^{(j)}$. Comparator 41 performs a further operation of determining the 4-bit index $K^{(j)}$ of the inner product $IP^{(j)}$ having the largest absolute magnitude M and the sign $\sigma^{(j)}$ of that inner product. The absolute value of the inner product, the index of the inner product, and the sign of the inner product are stored via line 42 in one storage register 43 during each of eight cycles. In comparator 51, $IP^{(\cdot)}$ is compared with the best, i.e. the maximum, inner product obtained and stored prior to that cycle, or $IP^{(MAX)}$, then $IP^{(MAX)}$, and $^{(MAX)}$ are also updated similarly according to the result of the above mentioned comparison. This is done 8 times, one for each coset. After 8 cycles $K^{(MAX)}$ and $\sigma^{(MAX)}$ together with an additional three bit word, $K^{(MAX)}$, which indicates $IP^{(j)}$ of that coset which produced the maximum inner product from the eight binary bits on output lines 53. The eight bits of information on lines 53 which is a maximum likelihood (ML) replica of the original information may be refined or enhanced in decoder 24 or applied directly to a utilization device 26.

Having explained the general steps or functions of the decoder of FIG. 2, it will be understood that some of the functional operations such as multiplication, comparison and counting iterations as well as determining whether to lookup information in a lookup table can logically be performed by the processor-controller-clock 34 or by more simplified dedicated logic structure. The steps shown in FIG. 2 are logically performed in order to achieve the fast decoding of a specific group of real numbers representative of information encoded into a Nordstrom-Robinson (16,256,6) non-linear code.

Before explaining the preferred embodiment structure and circuits shown in FIGS. 3 to 6, it will be understood that it is possible to construct an alternative decoding algorithm structure based on the partitioning of the Nordstrom-Robinson code into thirty-two cosets of a code isomorphic to the (4,3) parity even subcode (B) wherein the Nordstrom-Robinson (NR) code is equal to the union of thirty-two cosets, each of which is constructed by adding term by term to one of thirty-two coset leaders to each word of the subcode B. A mathematical expression for this construction is as follows:

The RM(4,1) subcode partitions the NR code into eight cosets, and we can write $$NR = \bigcup_{i=0}^{7} (RM(4,1) \oplus \rho_{RM}^{(i)})$$

The eight coset leaders of this partition, $\{\rho RM\}$ in 0,1 notation are:

$$\{\rho_{RM}\} = \begin{matrix} 0000 & 0000 & 0000 & 0000 \\ 0100 & 0010 & 0010 & 1011 \\ 0000 & 0101 & 0011 & 1001 \\ 1000 & 0100 & 1000 & 1011 \\ 0100 & 0001 & 0111 & 0010 \\ 0000 & 0110 & 0101 & 0011 \\ 0000 & 0011 & 1001 & 1010 \\ 0100 & 0100 & 1110 & 0001 \end{matrix}$$

NR can also be partitioned into 32 cosets of the (4.3) parity-even code (B), i.e.

$$NR = \bigcup_{i=0}^{31} (\rho_B^{(i)} \oplus B)$$

where $\rho(4j + k) = \rho_{RM}^{(j)} \oplus \rho_B^{(k)}$ $k = 0$ to 3 and $j = 0$ to 7

Figure 3:
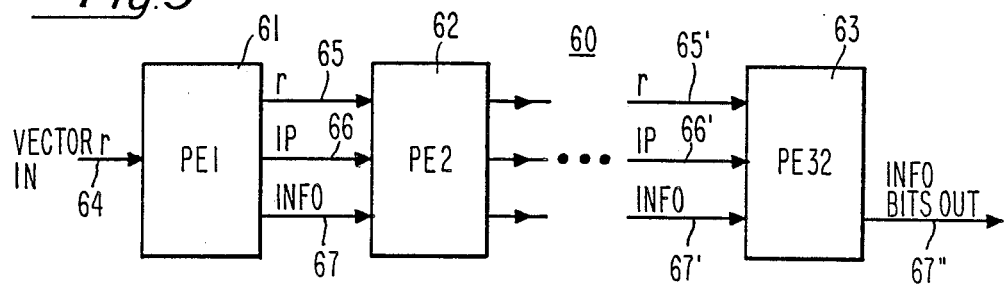
FIG. 3 is a block diagram of a preferred embodiment implementation of the present invention employing a systolic array of processing elements in a pipline of 32 processing elements.

$\rho^{(0)} = 0000\ 0000\ 0000\ 0000$ $\rho^{(1)} = 0011\ 0011\ 0011\ 0011$ $\rho^{(2)} = 0101\ 0101\ 0101\ 0101$ $\rho^{(3)} = 0110\ 0110\ 0110\ 0110$ Refer now to FIG. 3 showing in block diagram a systolic array implementation of a preferred embodiment decoder 22 for decoding the Nordstrom-Robinson 16,256,6 code. The systolic array 60 comprises thirty-two identical processing elements (PEs) 61,62 - - - 63 connected in a linear array. The vector processing element 61 receives the vector information on line 64 and produces three outputs r, ip and info to PE 2 on lines 65, 66, and 67 to the next following processing element 62 etc. Each subsequent processing element (PE 2 to PE 32) accepts the three inputs on line 65, 66 and 67 and products three similar outputs to the next following PE. The output of the last or thirty-second processing element 63 products an output on line 67' which is an output of eight information bits. The information bits on line 67", like line 23 in FIG. 1, are the output of the Nordstrom-Robinson decoder 22 on line 23.

Figure 4:
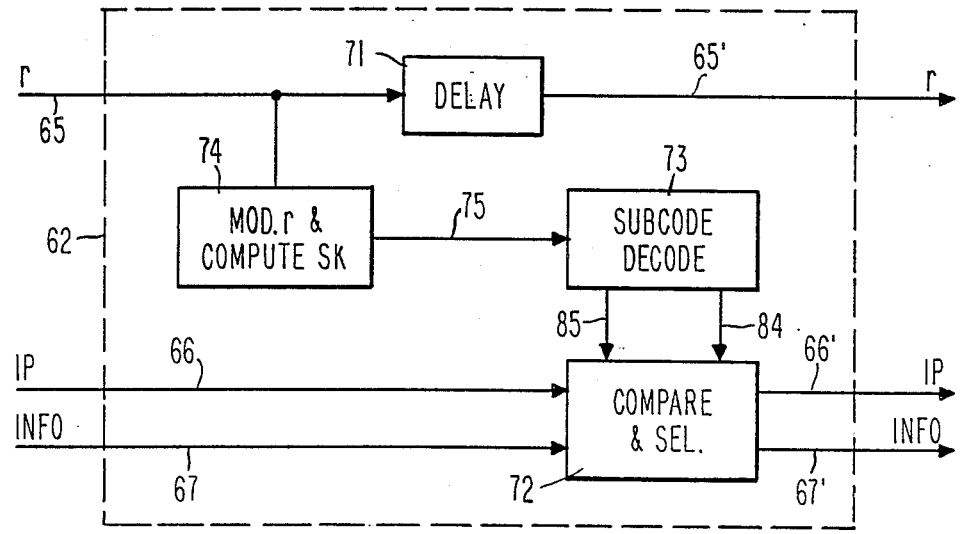
FIG. 4 is a block diagram showing in greater detail the functional elements of one of the processing elements of FIG. 3 including a subcode decoder.

Refer now to FIG. 4 showing a block diagram and greater detail of the structure of one of the thirty-two processing elements 61 to 63 shown in FIG. 3. The input r on line 65 to PE 62 is simply a delayed version of the received vector r on line 64 wherein the delay is performed in delay element 71 in each of the PEs. The sign of each coordinate of vector r is modified in block 74 in one-to-one correspondence with one out of 32 coset leaders assigned to each processing elements 61–63, and a new subcode product value $S_K$ and its sign is computed and applied via line 75 to subcode decoder 73, where $S_K = r_{4K} + r_{4K-1} + r_{4K-2} + r_{4K-3}$ for $K = 1$ to 4. The intermediate inner product (ip) on line 66 is the largest inner product (IP) produced by the preceding processing elements in all of the PEs to the left of the PE under consideration. This intermediate inner product (ip) is applied via lines 66 to the comparator 72 which receives an additional ip and additional information bits as inputs from subcode decoder 73. In each processing element, block 74 modifies the sign of each coordinate of the received vector r according to the coset leader pattern assigned to that processing element and then computes the four values of $S_K$s in the above formula. The corresponding information bits associated with the inner product on line 67 are also applied to the comparator 72 to produce the new inner product on line 66' and the corresponding information bits (info) associated with this new inner product on line 67. After each of the 32 processing elements (PEs) perform the operation just described, the last processing element 63 produces on its output line 67" eight information bits associated with the largest inner product with the input vector r which originated on line 65 as an input to the first processing element 61.

Figure 5:
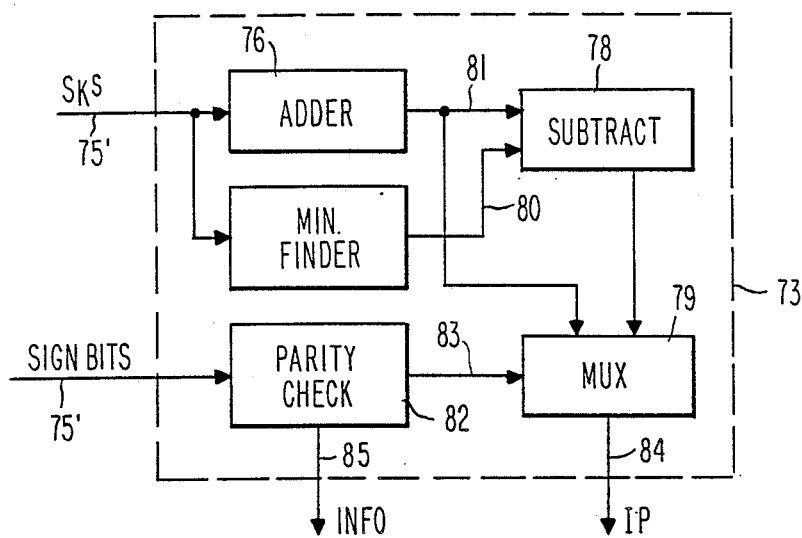
FIG. 5 is a block diagram showing in greater detail the structure of a preferred embodiment subcode decoder of the type employed in FIGS. 3 and 4.

Refer now to FIG. 5 showing a block diagram in greater detail of the subcode decoder 73 shown in FIG. 4. The input on lines 75' was produced on output line 75 from block 74 and contains the computed $S_K$s as well as the sign bit on line 75' for the $S_K$s. The $S_K$s on line 75' are applied to adder 76 and to minimum finder 77 which determines the minimum magnitude of the $S_K$s. Twice the output of the minimum finder 77 on line 80 and the adder output on line 81 are applied to a subtractor 78. The adder 76 and the subtractor 78 outputs are applied to a multiplexer 79 along with the output of parity checker 82. The sign bits for the $S_K$s are being applied to the parity check block 82 which controls the multiplexer 79 via line 83. If the parity is even, the multiplexer 79 selects the output of the adder 76 and bypasses the subtractor 78. If the parity is odd, the multiplexer 79 selects the output of the subtractor which comprises the output of the adders 76 minus the output of the minimum finder on line 80. The new inner product ip which is computed on line 84 and its associated information bits are presented on line 85 and are being applied to the comparator 72 shown in FIG. 4. If the newly computed inner product on line 84 to comparator 72 is smaller than the inner product being presented to comparator 72 on line 66, then the previously calculated inner product ip and its associated information bits are selected as the output for the new inner product and new information bits on line 66' and 67' respectively to be presented to the next following processing element. However, if the newly computed inner product on line 84 is less than the previously computed inner product, then the newly computed inner product and its associated information bits are passed through the comparator 72 to the next following processing element. Thus, as explained hereinbefore with regards to FIG. 3, the eight information bits on line 67" will be the information bits associated with the largest inner product produced by the subcode decoder 73 in the thirty-two processing elements.

Figure 6:
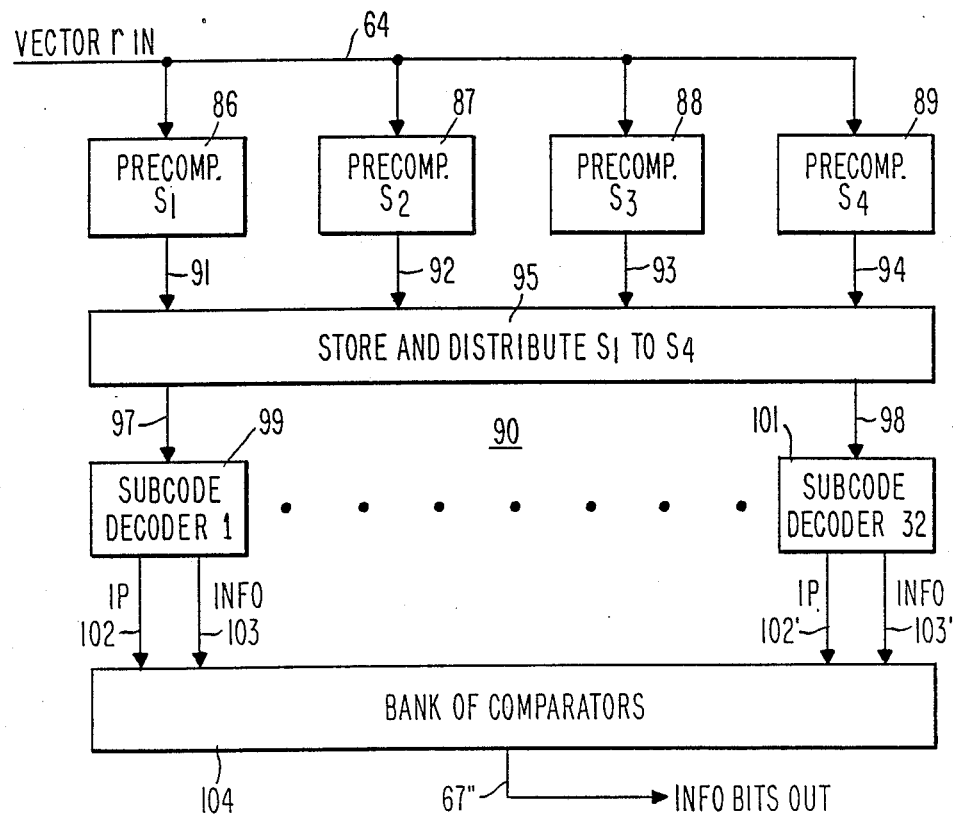
FIG. 6 is a block diagram of a modified or alternative embodiment of the decoder shown in FIGS. 3 to 5 in which the subcode decoders are arranged in parallel rather than series.

Refer now to FIG. 6 showing a block diagram of a modified or alternative embodiment to the embodiment of FIGS. 3 to 5 which produces the same output of eight information bits on its output line 67". In the embodiment shown in FIG. 6, the input line 64 which provides the sixteen real numbers is also numbered 64 and the line 67" which provides the final information bits is numbered 67". The decoder 90 which performs the same function of the systolic array 60 comprises four logic blocks 86 to 89 for precomputing all possible absolute values of the intermediate subcode values S1 to S4 which are presented as precomputed subcode values on output lines 91 to 94. The intermediate subcode values S1 to S4 are distributed and stored in memory store 95. The corresponding subcode values of S1 to S4 are then distributed to each of the 32 subcode decoders 99 to 101 through the output lines 97 to 98. The decoders 99 to 101 perform the identical decoding operation of the subcodes decoders 73 described with regards to FIG. 5 and produce the intermediate inner product values and their associated information bit values on lines 102, 103 to 102', 103'. Since FIG. 6 is basically a parallel operation, the bank of comparators 104 examines all of the outputs from the thirty-two subcode decoders and determines the largest magnitude inner product from the subcode decoders and their associated information bits (info) which is then presented on output line 67". This output is the same as the output described hereinbefore with regards to FIG. 3.

Having explained three structural embodiments for decoding received vectors r which are replicas of transmitted Nordstom-Robinson encoded information, it will be understood that the decoders receive an imperfect codeword version of the Nordstrom-Robinson code due to interference and noise which occurs in the equipment and through the transmission channels. The novel decoder determines the one set of information bits that were the most likely information bits transmitted in a Nordstrom-Robinson code. The effectiveness of the preferred embodiment structure permits error probabilities of $10^{-6}$

What is claimed is:

1. A high-speed decoder for decoding Nordstrom-Robinson encoded information comprising:
    a source of encoded signals in the form of multi-dimensional vectors (r) to be decoded,
    a plurality of computing elements coupled to said source of encoded signals,
    each said computing element having means for modifying said multi-dimensional vectors (r) and for producing subcode values ($S_K$),
    a plurality of subcode decoders coupled to said computing elements for producing an intermediate inner product (ip) value and an associated information bit value indicative of said intermediate inner product value, and a plurality of comparators each being coupled to the output of one of said subcode decoders for comparing said intermediate inner product values and for determining the maximum intermediate inner product and the information bits indicative of the maximum inner product, and
    output means coupled to said comparators for producing said information bits as a digital output indicative of the best mathematical estimate of the encoded signal being decoded.
2. A high-speed decoder as set forth in claim 1 wherein said digital information bits are indicative of a Nordstrom-Robinson word previously encoded.
3. A high-speed decoder as set forth in claim 1 wherein said subcode decoder comprises an adder coupled to a subtractor for producing said intermediate inner product values.
4. A high-speed decoder as set forth in claim 3 where said subcode decoder further comprises a parity checker coupled to a sign input of the subcode value for producing said digital output indicative of said intermediate inner product value.
5. A high-speed decoder as set forth in claim 1 wherein said plurality of computing elements are coupled in series in a systolic array.
6. A high-speed decoder as set forth in claim 5 wherein said plurality of said subcode decoders are each coupled in series between a comparator and a computing element.
7. A high-speed decoder as set forth in claim 1 wherein said plurality of computing elements are comprised of precomputing elements arranged in parallel.
8. A high-speed decoder as set forth in claim 7 wherein said plurality of computing elements comprise means for storing the output of said precomputing elements and for producing said subcode value outputs.
9. A high-speed decoder as set forth in claim 8 wherein said plurality of subcode decoders are connected in parallel to the outputs of said means for storing the outputs from said precomputing elements.
10. A high-speed decoder as set forth in claim 9 wherein said plurality of comparators comprise a bank of comparators connected to the outputs of said subcode decoders for producing a maximum inner product information bits at the output.
11. A high-speed decoder for decoding Nordstrom-Robinson encoded information in the presence of additive whit Gaussian noise, comprising:
    a plurality of processing elements coupled in series to form a systolic array,
    the first processing element in said systolic array having a signal input comprising a multi-dimensional vector of real numbers to be decoded,
    the last processing element of said systolic array having a digital output defining the best estimate of the Nordstrom-Robinson encoded information codeword,
    intermediate processing elements,
    said processing element having means for modifying a received multi-dimensional vector and means for computing a subcode value,
    subcode decoder means coupled to the output of said means for modifying a dimensional vector and for generating an intermediate inner product value and an associated information word indicative of the intermediate inner product,
    comparison means coupled to the output of said subcode decoder means and the preceeding processing element for producing an output indicative of the largest intermediate inner product input, and
    memory means responsive to said largest intermediate inner product produced by said last processing element for producing a digital output of the encoded information input.

* * * * *